(12) United States Patent
Slater

(10) Patent No.: US 11,519,523 B2
(45) Date of Patent: Dec. 6, 2022

(54) FLOW CONTROL DEVICE

(71) Applicant: Severn Glocon Limited, Quedgeley (GB)

(72) Inventor: Darryl Slater, Gloucester (GB)

(73) Assignee: Severn Glocon Limited

( * ) Notice: Subject to any disclaimer, the term of this patent is extended or adjusted under 35 U.S.C. 154(b) by 0 days.

(21) Appl. No.: 17/027,820

(22) Filed: Sep. 22, 2020

(65) Prior Publication Data
US 2021/0095785 A1  Apr. 1, 2021

(30) Foreign Application Priority Data
Sep. 27, 2019  (GB) ..................... 1913942

(51) Int. Cl.
*F16K 47/08* (2006.01)
*F16K 47/04* (2006.01)
*F16K 1/52* (2006.01)

(52) U.S. Cl.
CPC ............. *F16K 47/04* (2013.01); *F16K 1/52* (2013.01); *F16K 47/08* (2013.01); *Y10T 137/86734* (2015.04)

(58) Field of Classification Search
CPC .................. F16K 47/08; Y10T 137/86734
USPC ............................ 251/127; 138/42
See application file for complete search history.

(56) References Cited

U.S. PATENT DOCUMENTS

| 3,513,864 | A | * | 5/1970 | Self | F16K 47/08 137/14 |
| 3,780,767 | A | * | 12/1973 | Borg | F16K 47/08 137/625.3 |
| 3,941,350 | A |   | 3/1976 | Kluczynski | |
| 4,008,737 | A | * | 2/1977 | Kluczynski | F16K 3/34 137/625.3 |
| 4,018,245 | A | * | 4/1977 | Baumann | F16K 47/04 137/270 |
| 5,687,763 | A | * | 11/1997 | Steinke | F16K 47/08 137/625.33 |
| 5,769,122 | A | * | 6/1998 | Baumann | F16K 47/08 137/625.3 |
| 5,819,803 | A | * | 10/1998 | Lebo | F16K 47/08 138/42 |
| 6,244,297 | B1 | * | 6/2001 | Baumann | F16K 47/08 137/625.3 |
| 7,766,045 | B2 | * | 8/2010 | Fagerlund | F16K 47/08 138/42 |

(Continued)

FOREIGN PATENT DOCUMENTS

| GB | 2335054 |   | 9/1999 |   |
| GB | 2335054 | A * | 9/1999 | F16K 47/08 |

*Primary Examiner* — Robert K Arundale
(74) *Attorney, Agent, or Firm* — Anthony J. Bourget

(57) ABSTRACT

A flow control device is described comprising a body including a first flow control member 24a and a second flow control member 24b, each of which is provided with apertures or recesses 30, 36, 38, the apertures or recesses 30 of the first flow control member 24a overlapping the openings or recesses 36, 38 of the second flow control member 24b to define a flow path extending between a first surface 26 of the body and a second surface 28 of the body, wherein the shapes and/or sizes of at least some of the apertures or recesses 30, 36, 38 of at least one of the flow control members 24a, 24b are adapted to promote tangential or transverse fluid flow within the body.

20 Claims, 2 Drawing Sheets

(56) References Cited

U.S. PATENT DOCUMENTS

| | | | |
|---|---|---|---|
| 8,474,484 B2 * | 7/2013 | Stepanov | F16K 47/10 137/625.33 |
| 9,291,282 B2 * | 3/2016 | Fagerlund | F16K 3/24 |
| 2011/0214764 A1 * | 9/2011 | Fagerlund | F16K 47/08 137/597 |
| 2012/0216887 A1 * | 8/2012 | Fagerlund | F16K 47/08 137/560 |
| 2014/0264107 A1 * | 9/2014 | McCarty | F16K 47/08 251/118 |

* cited by examiner

FLOW CONTROL DEVICE

This invention relates to a flow control device, and in particular to a flow control device suitable for use with a high pressure control valve to dissipate energy in flows of liquids or gases controlled by the control valve, or similar applications.

One form of flow control device used in this type of application is described in GB2335054 and comprises a stack of apertured annular plates, each of which is provided with a series of openings, and a series of blanking plates. The openings in the apertured plates are positioned such that the openings provided in adjacent ones of the plates in the stack partially overlap one another resulting in the formation of a series of convoluted flow paths extending between the inner cylindrical surface of the stack and the outer cylindrical surface thereof. The blanking plates prevent significant axial movement of fluid within the stack.

Part of the valve member of the associated valve extends into the bore or central cylindrical passage of the stack and is positioned such that, when the valve is closed, the valve member closes most or all of the inner ends of the flow passages. As the valve member is moved towards a fully open position, the inner ends of the flow passages are gradually exposed, increasing the available flow area through the stack of plates. By appropriate control over the position of the valve member, the fluid pressure downstream of the flow control device may be controlled.

In the flow control device described in GB2335054, each flow path extends generally radially. Axially directed components will be induced within the fluid flow directions as the fluid flows along the respective flow path, the fluid flowing from an opening in one of the plates to an opening in an adjacent one of the plates. In normal use, no or minimal tangentially or transversely directed components will be induced in the fluid flow direction. As described in GB2335054, the shapes and positions of the openings are such that transverse or tangential flow can occur. By way of example, if one of the openings were to become blocked, such tangential flow may occur to allow by-passing of the blocked one of the openings. However, in normal use, such movement does not occur and nothing is provided within the arrangement to promote such flow.

The size of the drop in fluid pressure that occurs within each flow passage is dependent, in part, upon the number of changes in fluid flow direction that occurs within that flow passage, each change in fluid flow direction dissipating a quantity of energy, and also upon the length of the flow passage.

It is an object of the present invention to provide a flow control device in which an increased level of energy dissipation can occur within a device of given dimensions.

According to the present invention there is provided a flow control device comprising a body including a first flow control member and a second flow control member, each of which is provided with apertures or recesses, the apertures or recesses of the first flow control member overlapping the openings or recesses of the second flow control member to define a flow path extending between a first surface of the body and a second surface of the body, wherein the shapes and/or sizes of at least some of the apertures or recesses of at least one of the flow control members are adapted to promote tangential or transverse fluid flow within the body.

Each flow control member is preferably of annular shape, the flow control members being stacked upon one another such that the body is of hollow cylindrical form. The first surface may comprise the inner cylindrical surface of the body and the second surface may comprise the outer cylindrical surface of the body. The device may further comprise blanking plates restricting axial flow of fluid within the body, the blanking plates sandwiching therebetween pairs of the first and second flow control members.

Preferably, the apertures or recesses provided within the first flow control member are of a substantially uniform radial extent, and the apertures or recesses provided in the second flow control member are of a varying radial extent. By way of example, relatively large and relatively small radial extent apertures or recesses may be provided in an alternating fashion within the second flow control member.

The apertures or recesses provided in each flow control member are preferably arranged in radially extending lines. Preferably the apertures or recesses of a first line provided in the first flow control member overlap the apertures or recesses of two adjacent ones of the lines of apertures or recesses provided in the second flow control member.

Where the apertures or recesses of the second flow control member are arranged such that relatively large and relatively small radial extent apertures or recesses are arranged in an alternating fashion, they are preferably further arranged such that each relatively large radial extent aperture or recess is located adjacent relatively small radial extent apertures of the adjacent lines of apertures or recesses.

In such an arrangement, the overlapping of one of the apertures of the first flow control member with a relatively small aperture of the second flow control member results in the formation of a relatively large restriction to fluid flow. The overlapping of the said aperture of the first flow control member with one of the larger apertures of the second flow control member results in the formation of a smaller restriction to flow. Accordingly, within the said one of the apertures of the first flow control member there will be a pressure gradient urging fluid flow towards the larger of the apertures of the second flow control member. As the apertures of the second flow control member are arranged in an alternating pattern, it will be appreciated that the fluid is urged to flow in a tangential or transverse direction through each aperture or recess of the first flow control member, and undergoes repeated changes in the tangential or transverse flow direction as it passes between the first and second surfaces of the device in addition to the changes in axial flow direction as occur as the fluid moves between the apertures or recesses of the first and second flow control members. The presence of these additional changes in flow direction increases the dissipation of energy within the device and so reduces the pressure of the fluid exiting from the second surface of the flow control member. Furthermore, the flow passages are of extended length and so friction resistance between the fluid and the control device walls is increased, again reducing the pressure of the fluid exiting from the second surface.

Whilst the use of apertures or recesses of different sizes may be used to induce transverse or tangential flow components as set out hereinbefore, other techniques may be used. By way of example, by appropriately shaping the openings or recesses, fluid impinging or interacting with the walls defining the openings or recesses may be urged or directed to undergo the desired change in flow direction.

Preferably, the apertures or recesses are shaped to generate turbulence within the fluid flow therein. By way of example, projections may be positioned to extend into a fluid flow area and promote the disruption of smooth fluid flow therein.

The promotion of a transverse or tangential flow may result in the formation of a zig-zag shaped fluid flow path, with the fluid flow exiting from the second surface of the body at a position substantially radially aligned with the position at which it entered the body through the first surface thereof. In such an arrangement, the net torque experienced by the body is zero or small and so does not urge the body for rotation. Alternatively, the promotion of the transverse or tangential flow may result in the flow following a spiral like flow path through the device, for example inducing a vortex in the flow exiting the body. In such an arrangement, the body may experience a significant torque, in use, and so may require additional clamping loads or the like to be applied to resist such loads.

The invention will further be described, by way of example, with reference to the accompanying drawings, in which.

Figure 1:
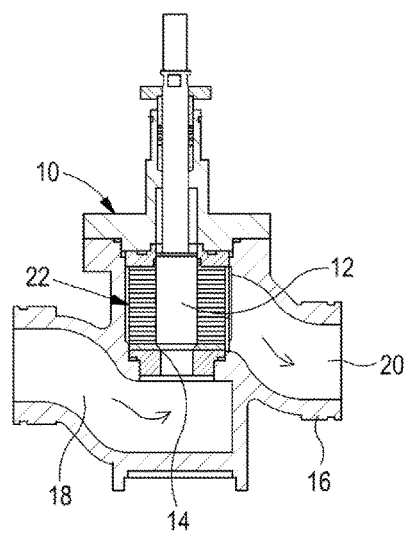
FIG. 1 is a diagrammatic cross-sectional representation of a valve incorporating a flow control device in accordance with an embodiment of the invention.

Referring to the accompanying drawings, a valve 10 is illustrated comprising a valve member 12 engageable with a seat 14 formed within a valve body 16. The valve body 16 includes an inlet port 18 and an outlet port 20, and the engagement of the valve member 12 with the seat 14 controls communication therebetween.

Located within the valve body 16 downstream of the seat 14 is a flow control device 22. The flow control device 22 comprises a body made up of a series of flow control members in the form of annular plates 24 stacked one upon another, the body being of hollow cylindrical form and defining a first, inner cylindrical surface 26 and a second, outer peripheral surface 28. As described below, the device 22 defines a plurality of flow passages, axially spaced apart from one another, that extend between the first and second surfaces 26, 28. Part of the valve member 12 extends within the central bore or passage of the body. In use, when the valve member 12 engages the seat 14 to prevent communication between the inlet and outlet ports 18, 20, the valve member 12 obscures the inner ends of most or all of the flow passages. As the valve member 12 is lifted from the seat 14, the movement of the valve member 12 gradually exposes more of the inner ends of the flow passages. It will be appreciated that opening movement of the valve member 12 away from the seat 14 not only establishes communication through the valve between the inlet and outlet ports 18, 20, but the distance through which the valve member 12 moves also controls the size of the restriction to fluid flow through the valve presented by the device 22, and so controls the fluid flow rate through the valve and pressure downstream thereof.

The nature and functioning of the valve as described above is substantially as set out in GB2335054 and so will not be described herein in further detail, other than as necessary for the understanding of the present invention. Furthermore, whilst the description hereinbefore is of flow in one flow direction, it will be appreciated that flow through the device 22 may occur in the reverse direction, if desired, subject to appropriate modification of the valve. The inlet and outlet ports need not be arranged as shown but could be, for example, angled to one another rather than being substantially in line, if desired.

In accordance with the invention, the plates 24 of the device 22 are designed in such a manner as to promote the formation of transverse or tangential components in the flow of fluid through the device 22. In the arrangement illustrated, the plates 24 comprise a series of pairs of apertured plates 24a, 24b, and each pair being isolated from an adjacent pair by a blanking plate 24c. The first apertured plates 24a are each formed with a series of apertures 30, the apertures 30 all being of a substantially uniform radial extent. The apertures 30 are arranged in a series of radially extending lines, angularly spaced apart from one another by radially extending spokes. The transverse or tangential dimensions of the apertures 30 increase with increasing distance from the axis of the device 22 but, as mentioned above, they are of substantially uniform radial extent. Within each aperture 30, a tongue 32 projects, dividing the respective aperture 30 into a first part 30a and a second part 30b. The tongue 32 does not extend completely across the aperture 30, and so the first and second parts 30a, 30b communicate with one another.

The second apertured plate 24b is of a form similar to the first apertured plate 24a with the exception that the apertures 34 formed therein are of two different radial extents. Accordingly, the second plate 24b includes a series of relatively small radial extent apertures 36 and a series of relatively large radial extent apertures 38. As with the apertures 30, the apertures 36, 38 are provided with tongues 32 dividing them into parts 36a, 36b, 38a, 38b, the parts 36a, 36b communicating with one another and the parts 38a, 38b communicating with one another.

Within each radial line, the apertures 36, 38 are arranged in an alternating fashion. Similarly, the lines of apertures 36, 38 are arranged in an alternating fashion so that within the body each aperture 36 is surrounded radially and laterally or tangentially by adjacent apertures 38, and each aperture 38 is surrounded radially and laterally or tangentially by adjacent apertures 36.

The plates 24a, 24b are arranged such that the spokes of one of the plates 24a, 24b are aligned with the tongues 32 of the adjacent one of the plates 24a, 24b, and each pair of plates 24a, 24b is sandwiched between a pair of blanking plates 24c. The arrangement is such that the apertures 30, 36, 38 partially overlap one another to define the series of flow passages that extend between the first and second surfaces 26, 28 of the body.

The arrangement of the plates 24a, 24b and the apertures 30, 36, 38 is such that a radially inner part of each aperture 30 partially overlaps a relatively small aperture 36 and partially overlaps a relatively large aperture 38. Similarly, the radially outer part of each aperture 30 partially overlaps a relatively small aperture 36 and partially overlaps a relatively large aperture 38. The alternating arrangement of the apertures 36, 38 is such that each part 30a, 30b of each aperture 30 registers with both a relatively small aperture 36 and a relatively large aperture 38.

Fluid flowing into the aperture 30 from one of the relatively large apertures 38 in the second plate 24b, if it continued to flow in a substantially radial direction, would be required to enter, upon exiting the aperture 30 a relatively small aperture 36. The relatively small aperture 36 presents a relatively large restriction to fluid flow, and so rather than flow through the relatively small aperture 36, the fluid is urged to pass transversely or tangentially through the aperture 30 to exit via the adjacent relatively large aperture 38 as denoted by the arrows in FIG. 5. It will be appreciated, therefore, that the design of the device 22 is such that the formation of a transverse or tangential component in the fluid flow is promoted.

Upon exiting the aperture 30 via the relatively large aperture 38, the fluid flow enters the next radially outward aperture 30 where a tangential or transverse component is again induced in the fluid flow direction.

Figure 4:
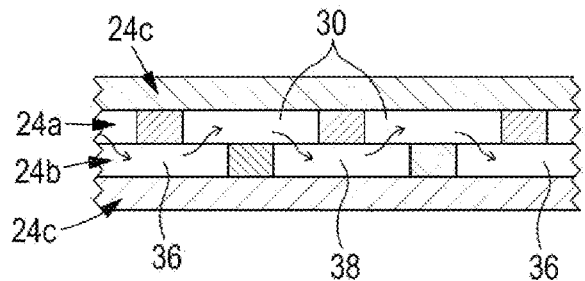
FIGS. 4 and 5 are diagrammatic views illustrating the fluid flow paths through the flow control device.
Figure 5:
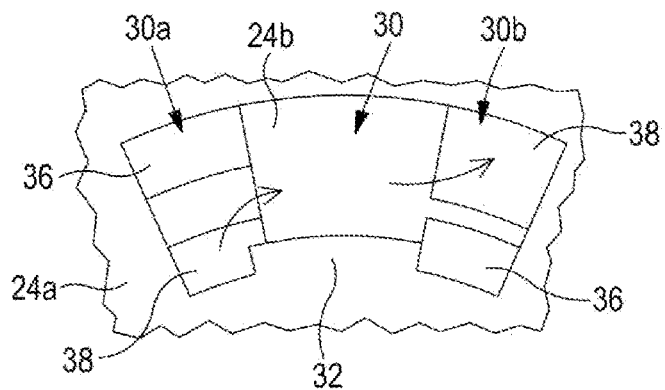

In the arrangement shown, it will be appreciated that in flowing between the first and second surfaces 26, 28, the fluid is urged not only to undergo repeated changes of direction in the axial direction of the body and shown in FIG. 4 (as occurs in the arrangement of GB2335054) but also to undergo repeated changes of direction in the transverse or tangential direction as shown in FIG. 5. The fluid flow thus follows a convoluted, zig-zag path between the surfaces 26, 28. At each change in direction energy is dissipated. Accordingly, as the arrangement of the invention includes numerous changes in flow direction, more than occurs in the arrangement of GB2335054, an increased level of energy dissipation may be achieved, or a given level of energy dissipation may be achieved in a device of smaller dimensions.

Figure 6:
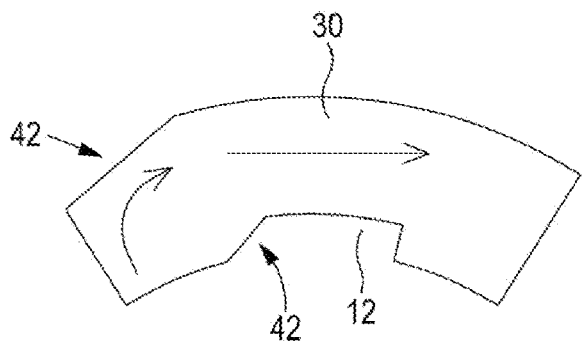
FIGS. 6 to 8 illustrate a selection of variations of the device shown in FIGS. 1 to 5.
Figure 7:
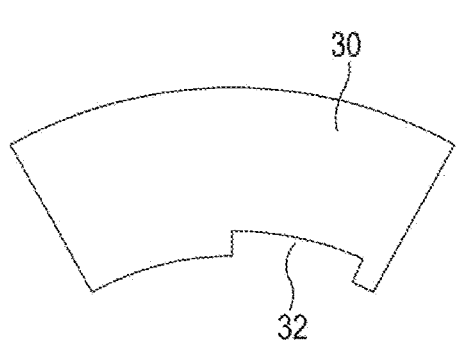

Whilst in the embodiment described hereinbefore the changes in transverse or tangential flow direction are induced or promoted through the use of apertures of different sizes positioned to form differing sizes of flow restriction, the changes in direction may be promoted through the incorporation of suitably shaped apertures to direct fluid flow in a desired direction. By way of example, the openings could be shaped as shown in FIG. 6 to include flow directing regions or baffles 42 which promote the desired changes in flow direction. A further alternative, as shown in FIG. 7, may be to locate the tongues 32 in staggered, off-center locations. The interaction of the tongues 32 with the apertures of the adjacent plates may serve to partially close certain of the apertures, resulting in the formation of different size restrictions to fluid flow and so promoting the formation of tangential or transverse components in the fluid flow in a manner similar to that described hereinbefore.

Although in the arrangement described hereinbefore the fluid follows a zig-zag shaped path between the first and second surfaces 26, 28, if desired the fluid could be urged to follow a substantially spiral shaped path by appropriate shaping and positioning of the apertures. Such an arrangement may result in the formation of a vortex or the like in the fluid exiting the device 22. As the loads experienced by the device 22 in such an arrangement would not be balanced, it may be required to provide additional clamp means or the like to resist rotation of the device 22, in use. In a further alternative, certain pairs of plates may be configured to drive fluid in opposite directions. By way of example, one pair of plates may be configured to drive fluid in a clockwise direction with a subsequent pair of plates configured to drive fluid in an anticlockwise direction.

Figure 8:
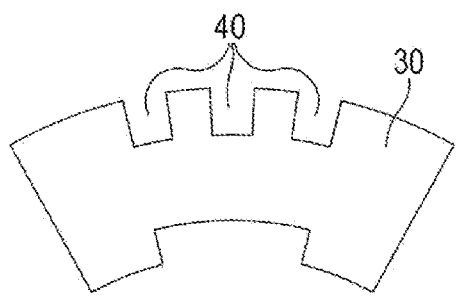

As shown in FIG. 8, it may be desired, in some arrangements, to shape the apertures to include flow disrupting projections 40 which disrupt the flow across one or more of the apertures, thereby further increasing energy dissipation.

Figure 2:
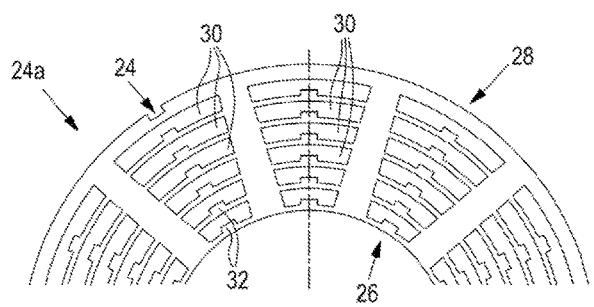
FIGS. 2 and 2a are diagrammatic views illustrating part of a variant of a first flow control member of the device shown in FIG. 1.
Figure 2A:
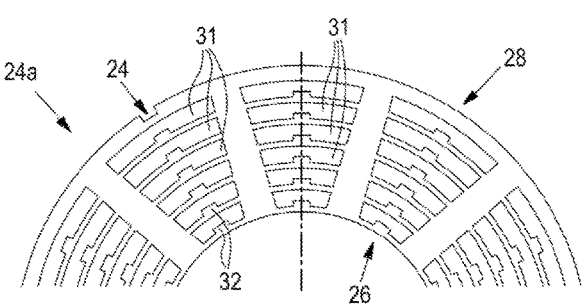
Figure 3:
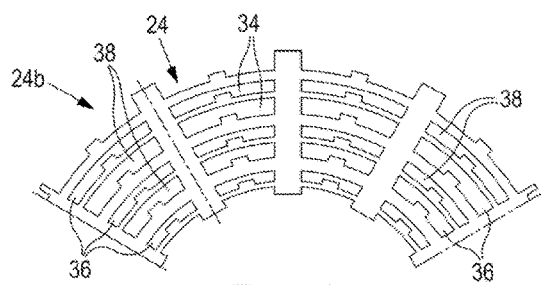
FIGS. 3 and 3a are views similar to FIGS. 2 and 2a, respectively, each illustrating part of a variant of a second flow control member.
Figure 3A:
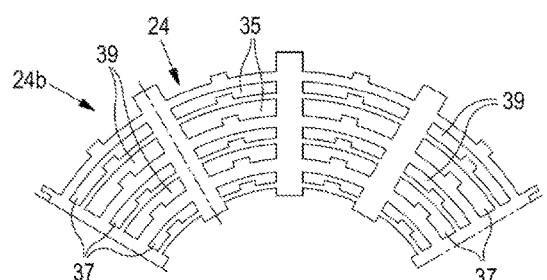

The variants illustrated in FIGS. 6 to 8 are just a few of a number of possible variants, and it will be appreciated that the invention is not restricted in this regard Whilst the formation of openings extending completely through the plates is convenient, a similar effect may be achieved by forming recesses 31, 35, 37, 39, in the facing surfaces thereof, the recesses 31, 35, 37, 39, as shown in FIGS. 2a and 3a, corresponding mutatis mutandis to the apertures 30, 34, 36, 38, described above with reference to FIGS. 2 and 3. The recesses do not extend completely through the plates. In such an arrangement, the blanking plates may be omitted.

Whilst specific embodiments of the invention are described hereinbefore with reference to the accompanying drawings, it will be appreciated that a range of modifications or alterations may be made thereto without departing from the scope of the invention as defined by the appended claims.

The invention claimed is:

1. A flow control device comprising a body including a first flow control member and a second flow control member, each of which is provided with apertures or recesses, the apertures or recesses of the first flow control member partially overlapping the apertures or recesses of the second flow control member in a radial extension to define a flow path extending between a first surface of the body and a second surface of the body, at least a portion of the first flow control member or the second flow control member defining a tongue projecting into the respective aperture or recess, the tongue being located relative to the aperture or recess in an off-center location, whereby at least some of the apertures or recesses of at least one of the flow control members are adapted to promote, relative to a radial extension between the first surface and the second surface, non-radial fluid flow within and through the apertures or recesses, and thereby within the body.

2. A device according to claim 1, wherein each flow control member is of annular shape, the flow control members being stacked upon one another such that the body is of hollow cylindrical form.

3. A device according to claim 2, wherein the first surface comprises the inner cylindrical surface of the body and the second surface comprises the outer cylindrical surface of the body.

4. A device according to claim 2, further comprising blanking plates restricting axial flow of fluid within the body, the blanking plates sandwiching therebetween pairs of the first and second flow control members.

5. A device according to claim 1, wherein at least some of the apertures or recesses are shaped to promote the formation of a non-radial flow therein.

6. A device according to claim 1, wherein the shapes of the overlapping apertures or recesses of the first and second control members are selected to result in the formation of a non-radially directed pressure gradient within the apertures or recesses, promoting the formation of a non-radial flow therein.

7. A device according to claim 1, and comprising projections positioned to extend into a fluid flow area and promote the disruption of smooth fluid flow therein.

8. The device according to claim 1, wherein at least one of the flow control members defines more than one tongue projecting into the respective aperture or recess.

9. A flow control device comprising a body including a first flow control member and a second flow control member, each of which is provided with apertures or recesses, the apertures or recesses of the first flow control member partially overlapping the apertures or recesses of the second flow control member in a radial extension to define a flow path extending between a first surface of the body and a second surface of the body, and further overlapping in a non-radial fluid flow dimension, wherein shapes and/or sizes of at least some of the overlapping apertures or recesses of the first and second control members present a relatively larger restriction to fluid flow and relatively smaller restriction to fluid flow and/or comprise flow-directing regions, within the aperture or recess, whereby at least some of the apertures or recesses of at least one of the flow control members are adapted to promote, relative to a radial extension between the first surface and the second surface, non-radial fluid flow within and through the apertures or recesses, and thereby within the body, wherein the apertures or recesses provided within the first flow control member are of a substantially uniform radial extent, and the apertures or recesses provided in the second flow control member are of a varying radial extent.

10. A device according to claim 9, wherein relatively large and relatively small radial extent apertures or recesses are arranged in an alternating fashion within the second flow control member.

11. A device according to claim 9, wherein the apertures or recesses provided in each flow control member are arranged in radially extending lines.

12. A device according to claim 11, wherein the apertures or recesses of a first line provided in the first flow control member overlap the apertures or recesses of two adjacent ones of the lines of apertures or recesses provided in the second flow control member.

13. The device according to claim 9, wherein each flow control member is of annular shape, the flow control members being stacked upon one another such that the body is of hollow cylindrical form.

14. A device according to claim 13, wherein the first surface comprises the inner cylindrical surface of the body and the second surface comprises the outer cylindrical surface of the body.

15. A device according to claim 9, further comprising blanking plates restricting axial flow of fluid within the body, the blanking plates sandwiching therebetween pairs of the first and second flow control members.

16. A flow control device comprising a body including a first flow control member and a second flow control member, each of which is provided with apertures or recesses, at least some of the apertures or recesses of the first flow control member partially overlapping apertures or recesses of the second flow control member in a radial extension to define a flow path extending between a first surface of the body and a second surface of the body, wherein at least one of the first flow control member and the second flow control member has at least one tongue which projects into at least one of the overlapping apertures or recesses of the first flow control member or the second flow control member, the at least one tongue segmenting the aperture or recess into a first segment and a second segment, the first segment and second segment in fluid communication with each other for at least some non-radial fluid flow across the first and second segments, the arrangement of the control members and the apertures or recesses being such that (a) a radially inner part of each aperture or recess partially overlaps a relatively small aperture or recess and partially overlaps a relatively large aperture or recess and (b) a radially outer part of each aperture partially overlaps with a relatively small aperture or recess and partially overlaps a relatively large aperture or recess, whereby each of the first segment and the second segment of each aperture or recess registers with both a relatively small aperture or recess and a relatively large aperture or recess, thereby providing differently sized restrictions to fluid flow in the first segment and the second segment of the aperture or recess.

17. The flow control device of claim 16 wherein the apertures or recesses provided within the first flow control member are of a substantially uniform radial extent, and the apertures or recesses provided in the second flow control member are of a varying radial extent.

18. A device according to claim 16, wherein each flow control member is of annular shape, the flow control members being stacked upon one another such that the body is of hollow cylindrical form.

19. A device according to claim 18, wherein the first surface comprises the inner cylindrical surface of the body and the second surface comprises the outer cylindrical surface of the body.

20. A device according to claim 16, further comprising blanking plates restricting axial flow of fluid within the body, the blanking plates sandwiching therebetween pairs of the first and second flow control members.

* * * * *